F. C. DORMENT.
EYE MASSAGING AND MEDICATING APPARATUS.
APPLICATION FILED JAN. 2, 1919.
1,377,760. Patented May 10, 1921.
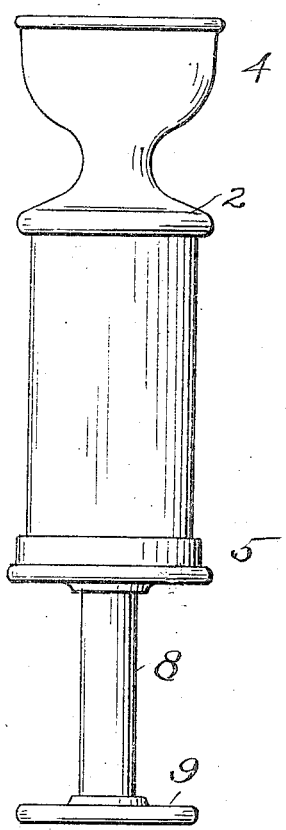
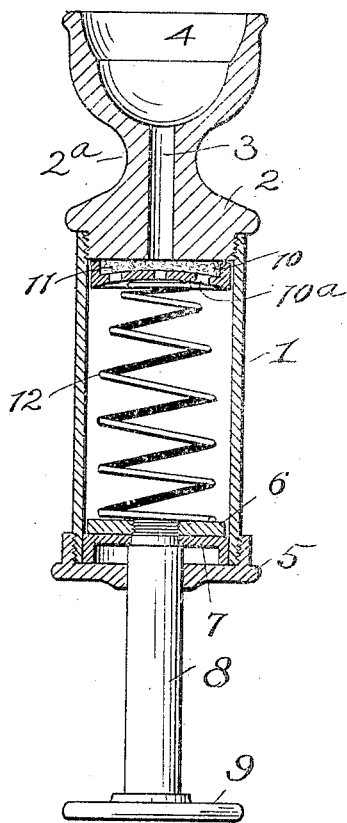
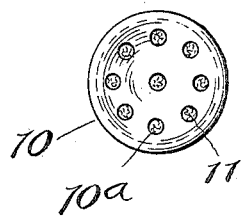
Inventor:
Frank C. Dorment
By
Thurston & Kwis
Attys.

UNITED STATES PATENT OFFICE.

FRANK C. DORMENT, OF CLEVELAND, OHIO.

EYE MASSAGING AND MEDICATING APPARATUS.

1,377,760.  Specification of Letters Patent.  Patented May 10, 1921.

Application filed January 2, 1919. Serial No. 269,301.

*To all whom it may concern:*

Be it known that I, FRANK C. DORMENT, a citizen of the United States, residing at Cleveland, in the county of Cuyahoga and State of Ohio, have invented a certain new and useful Improvement in Eye Massaging and Medicating Apparatus, of which the following is a full, clear, and exact description.

The present invention relates to an apparatus designed and adapted to be used in massaging the ball of the eye, and additionally where desired the apparatus may be utilized to treat the eye with a medicinal substance.

An object of the invention is to provide an apparatus for the purpose which may be manipulated by the user, not requiring the skill of a physician in its use.

Another object is to provide an apparatus for the purpose which requires no adjustment in the use thereof, but is always in condition for use, and is so constructed that the whole apparatus is entirely sanitary and may be easily kept in sanitary condition.

A further object is to provide an apparatus of the character which is simple in construction, and one in which the parts are so fashioned and assembled that the device is easy to manufacture, thereby enabling a low manufacturing cost.

A further object is to provide a device which is durable in its construction so that the parts do not deteriorate with use.

Other objects will appear as the description of the invention proceeds.

Reference should be had to the accompanying drawings forming a part of the specification, in which Figure 1 is an elevation of the device; Fig. 2 is a sectional elevation of the device; and Fig. 3 is a top plan view of a portion of the device.

Referring to the drawings, 1 indicates a casing which at one end is provided with a head 2, the head preferably being detachable from the casing and secured to the casing in any desired manner, as by means of a threaded connection. The head is provided with a central passageway 3 which communicates with a substantially spherical cavity indicated at 4. This cavity is of proper shape and size to correspond with the shape of the human eye ball, so that in the employment of the apparatus the device in its operation in massaging the eye ball causes the eye ball of the user to fit within the cavity 4.

At the opposite end of the casing 1 there is a closing member 5. This closure member has a threaded attachment for the casing 1. Within the casing 1 there is a plunger 6. This plunger is preferably provided with a packing 7, so that the plunger is substantially non-leakable. To the plunger there is secured a rod 8 which extends through the closure member 5, and the rod at its outer end is provided with a head end 9.

Within the casing 1 there is a cup 10. This cup substantially fits within the casing 1, and the bottom of the cup is provided with a plurality of openings such as indicated at 10ª. Within the cup there is a pad 11 of absorbent material.

Extending within the casing 1 there is a spring 12. This spring at one end bears against the bottom or lower side of the cup 10 and at its opposite end engages with the piston 6 so that the spring normally holds the cup 10 in contact with the under side of the head 2, and also normally holds the piston 6 at the extreme end of the casing 1.

The head 2 is provided with a neck indicated at 2ª which forms a convenient place for the first and second fingers of the user to straddle when the device is to be used, the thumb of the user engaging with the head cap 9. When thus grasped by the user the cup portion of the head is presented to the eye, and the head 9 depressed. This forces the air contained within the casing 1 through the part 11, which part is impregnated with a medicinal composition and the air in passing through the part 11 picks up and carries with it a quantity of the medicinal substance and delivers it against the eye-lid of the user. The head 9 is then released from the thumb of the user, and under the action of the spring 12 the piston 6 returns to its normal position. This induces a suction within the cavity 4 tending to draw the eye ball of the user toward and into the cavity 4. A few repetitions of the depression of the plunger 6 will cause repeated manipulation of the eye ball, thus producing a massage of the eye ball and simultaneously delivering the medicinal substance in vapor or gaseous form, in which condition it easily penetrates between the lids of the eye and comes in contact with the eye ball.

It will at once be apparent that the device is entirely capable of being adapted to the requirements of the user by supplying to the part 11 the proper medicinal substance which may be needed in the treatment of the eyes of a particular user. Or the part 11 may be supplied with a medicinal substance which in its character will be generally beneficial to the eye in relieving congestion, and inflammation.

As will be apparent, the device in its use is alternately applied to each eye of the user, and requires no adjustment in the use thereof.

The several component elements of the device may be made of any desired material, and in form the parts are such that they are easy of manufacture, thereby enabling a low cost of manufacture.

The parts of the device are durable and may be constructed of material which does not deteriorate with use, or with age, so that the device is substantially indestructible.

Having described my invention, I claim:

1. In an eye massaging device, the combination with a casing of a head member secured thereto, said head member being provided with a spherical cavity and a duct connecting the spherical cavity with the interior of the casing, a removable cup within said casing, said cup containing absorbing material, a plunger within the casing, resilient means normally urging said plunger toward one end of the casing, and a handle connected with the plunger and extending upon the outside of the casing.

2. In an eye massaging device, the combination with a casing of a head secured to the casing, said head being provided with a substantially spherical cavity, and a duct connecting said cavity with the interior of the casing, a cup within the casing, absorbent material within the cup, said cup being provided with openings through a wall thereof, a plunger within the casing, a spring extending between said cup and the plunger, and a handle secured to the plunger and extending upon the outside of the casing.

In testimony whereof, I hereunto affix my signature.

FRANK C. DORMENT